(12) United States Patent
Franken et al.

(10) Patent No.: US 7,231,604 B1
(45) Date of Patent: Jun. 12, 2007

(54) INDIVIDUALIZED CONTENT GUIDE

(75) Inventors: Kenneth A. Franken, Iowa City, IA (US); Toufic Moubarak, Iowa City, IA (US); Jack Perry, Cedar Rapids, IA (US)

(73) Assignee: Decisionmark Corp., Cedar Rapids, IA (US)

( * ) Notice: Subject to any disclaimer, the term of this patent is extended or adjusted under 35 U.S.C. 154(b) by 1220 days.

(21) Appl. No.: 09/681,172

(22) Filed: Feb. 8, 2001

Related U.S. Application Data

(63) Continuation-in-part of application No. 09/538,215, filed on Mar. 30, 2000, now Pat. No. 6,252,547, which is a continuation-in-part of application No. 09/092,128, filed on Jun. 5, 1998, now Pat. No. 6,147,642.

(51) Int. Cl.
*G06F 17/00* (2006.01)

(52) U.S. Cl. .................. 715/721; 715/722; 715/718; 715/717; 715/716

(58) Field of Classification Search ............... 342/357; 455/426; 345/169, 327, 721; 725/37–61; 715/722, 716–718, 721
See application file for complete search history.

(56) References Cited

U.S. PATENT DOCUMENTS

| | | | |
|---|---|---|---|
| 4,701,934 A | | 10/1987 | Jasper |
| 5,477,262 A | * | 12/1995 | Banker et al. ............... 725/38 |
| 5,479,266 A | * | 12/1995 | Young et al. ............... 386/83 |
| 5,535,430 A | | 7/1996 | Aoki et al. |
| 5,587,715 A | | 12/1996 | Lewis |
| 5,758,259 A | * | 5/1998 | Lawler ....................... 725/45 |
| 5,797,082 A | | 8/1998 | Lusignan |
| 5,950,127 A | | 9/1999 | Nitta et al. |
| 6,002,394 A | | 12/1999 | Schein |
| 6,147,642 A | | 11/2000 | Perry et al. |
| 6,182,287 B1 | | 1/2001 | Schneidewend |
| 6,215,483 B1 | * | 4/2001 | Zigmond ................. 725/112 |
| 6,240,555 B1 | * | 5/2001 | Shoff et al. .............. 725/110 |

FOREIGN PATENT DOCUMENTS

| | | |
|---|---|---|
| EP | 834798 | 10/1997 |
| JP | 06 268934 | 9/1994 |
| JP | 06-268934 | 9/1994 |
| WO | WO 99 65237 | 6/1999 |

OTHER PUBLICATIONS

Printed three pages of a website on Apr. 13, 2000. The Web address was www.antennaweb.org.
European Standard Seacrh Report dates Aug. 2, 2001.

* cited by examiner

*Primary Examiner*—Steven Sax
*Assistant Examiner*—Peng Ke
(74) *Attorney, Agent, or Firm*—Simmons Perrine PLC

(57) ABSTRACT

A computer and Internet-based system and method for providing television and radio programming information to users, through a multi-tabbed viewing screen, where at least one of the tabs is individualized to a particular viewer's preferences.

6 Claims, 2 Drawing Sheets

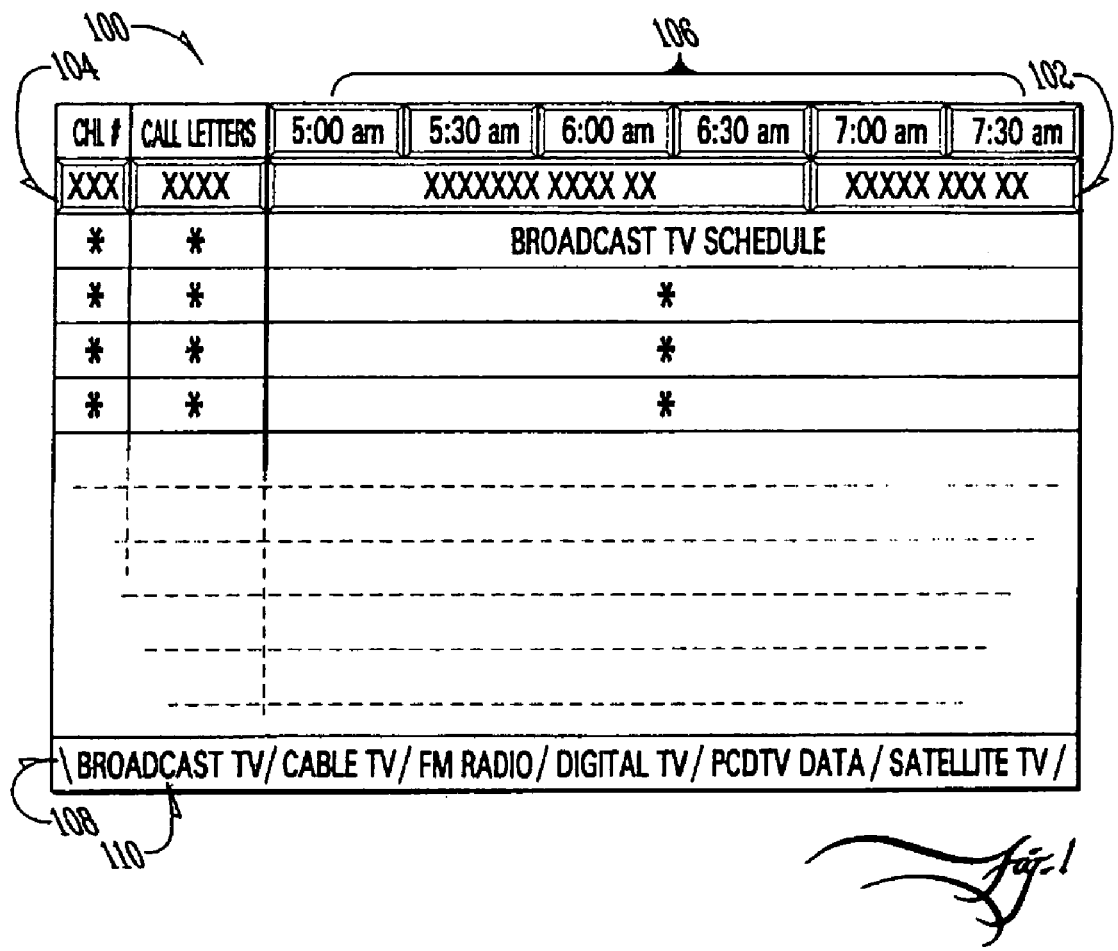

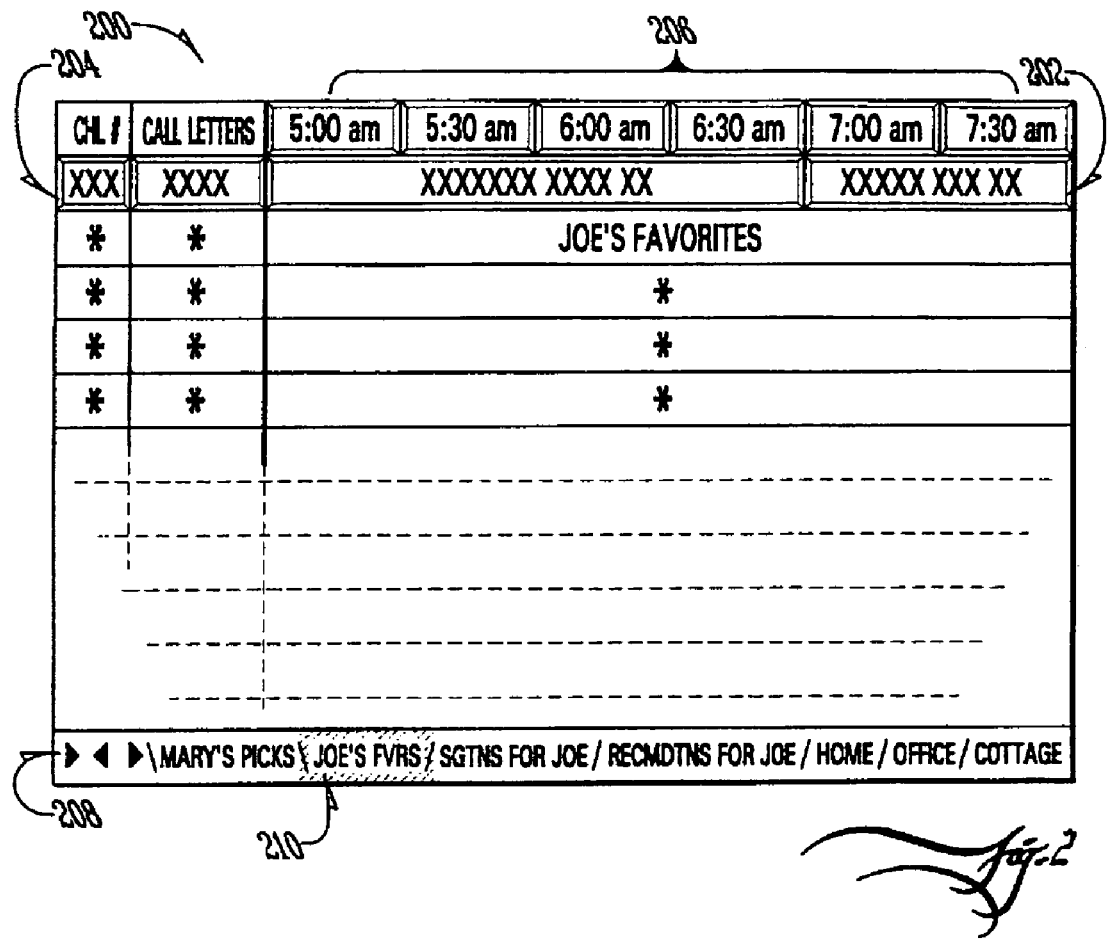
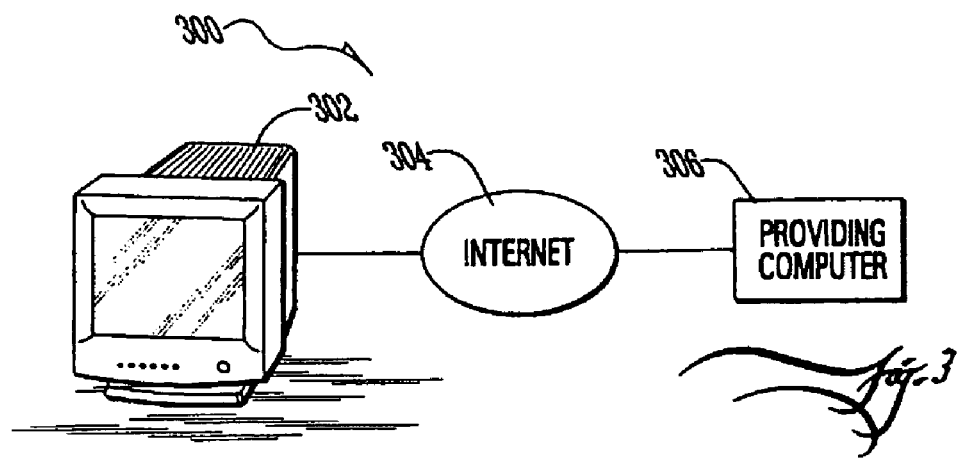

INDIVIDUALIZED CONTENT GUIDE

CROSS REFERENCE TO RELATED APPLICATIONS

This application is a continuation-in-part (CIP) of and relates to application entitled "METHOD AND APPARATUS FOR LIMITING ACCESS TO SIGNALS DELIVERED VIA THE INTERNET", having Ser. No. 09/538,215 and filed on Mar. 30, 2000 now U.S. Pat. No. 6,252,547 issued Jun. 29, 2001, which is a CIP of Ser. No. 09/092,128 for "METHOD AND APPARATUS FOR LIMITING ACCESS TO SATELLITE COMMUNICATION SIGNALS" filed on Jun. 5, 1998, now issued as U.S. Pat. No. 6,147,642. This application also is related to co-pending application entitled "METHOD AND SYSTEM FOR PROVIDING HOUSEHOLD LEVEL TELEVISION PROGRAMMING INFORMATION", which is filed on even date herewith and assigned to the same assignee. The above-referenced applications are incorporated herein in their entirety by these references.

BACKGROUND OF INVENTION

In recent years, with the proliferation of sources of television programming including conventional terrestrially broadcast TV, cable TV, and satellite-delivered TV, numerous programming choices exist for a consumer. Consumers often desire to have a guide which shows the programming choices available at various times. The magazine TV Guide is one well-known example of a printed programming guide.

TV Guide Online is an example of a web-based programming guide which provides a user with a programming list which is configurable using drop-down boxes or links to enable customers to switch the content display to another source; e.g., from cable only to broadcast only, etc.

While such web-based programming guides have enjoyed success in the past, they have some drawbacks. First of all, the TV Guide Online can often provide too much information. Often, it is difficult to find the programming which is desirable to the viewer. Secondly, the drop-down boxes of the TV Guide Online guide are not intuitive, in the sense that it is easy for a viewer to forget or otherwise not understand that the information being displayed has been narrowed from a larger list of potential sources.

Consequently, there exists a need for improved methods and systems for providing TV programming information to viewers in an efficient manner.

SUMMARY OF INVENTION

It is an object of the present invention to provide a system and method for providing TV programming information in an efficient manner.

It is a feature of the present invention to utilize a multi-tab programming guide.

It is another feature of the present invention to include multiple tabs which sort programming information by multiple criteria, such as source, category, user preference, location, past user programming selections, etc.

It is an advantage of the present invention to achieve improved efficiency in delivery of programming information to viewers.

The present invention is an apparatus and method for providing TV programming information, which is designed to satisfy the aforementioned needs, provide the previously stated objects, include the above-listed features, and achieve the already articulated advantages. The present invention is carried out in a "wasted time-less" manner in a sense that the time consumed by a viewer in sifting through programming information which does not meet the desires of the viewer, has been greatly reduced.

Accordingly, the present invention is a system and method for delivery of TV programming information, including a configurable multi-tab display, with user selectable preferences and machine-generated suggestions and recommendations.

BRIEF DESCRIPTION OF DRAWINGS

The invention may be more fully understood by reading the following description of the preferred embodiments of the invention, in conjunction with the appended drawings wherein:

FIG. 1 is a simplified view of a guide of the present invention, which shows a Broadcast TV tab being displayed.

FIG. 2 is a simplified view of the guide of the present invention which show view tabs which have variable content definitions.

FIG. 3 is a simplified block diagram view of the system of the present invention.

DETAILED DESCRIPTION

Now referring to the drawings wherein like numerals refer to like matter throughout, and more specifically referring to FIGS. 1 and 2, there are shown television programming guides of the present invention generally designated 100 and 200 respectively, which include two dimensional arrays of individual timed programming cells 102 and individual timed programming cells 202, respectively, which cells may each contain information relating to a particular program on a particular television channel. Channel number and station call letter display area 104 and channel number and station call letter display area 204 are similar to that of existing web-based programming guides. In fact, the entire guides 100 and 200 are very similar to prior art television programming guides, except for a few important aspects.

One major difference between the present invention and the prior art is the linearly arranged guide content control tabs 108 and linearly arranged guide content control tabs 208, which are shown disposed along the bottom edge of the programming guides 100 and 200. Linearly arranged guide content control tabs 108 and linearly arranged guide content control tabs 208 could be disposed any place about the periphery of the individual timed programming cells 102 and individual timed programming cells 202. Individual timed programming cells 102 and individual timed programming cells 202 provide benefits over drop-down boxes as are used in TV Guide Online, because they continuously show several different viewing options and provide for more intuitive navigation among the various viewing options.

Another difference between the present invention and the prior art is the inclusion of a floating cursor-linked display for detailed programming information. These floating cursor-linked displays are commonly used for help or hint displays in many programs. It is believed that they have not been used heretofore in prior art electronic online programming guides. The user can move the cursor over cells in individual timed programming cells 102 and individual timed programming cells 202 and display detailed information regarding the television program associated with that cell. An alternative to a floating cursor-linked display would be a display generated when the user right clicks on a mouse button. The present invention preferably is used in conjunction with a PCDTV card for demodulating television signals for display by the display in user PC 302. When a PCDTV board is used as is described in co-pending application entitled "Guide With Program Delivering Links", the user can left click on one of the individual timed programming cells 102 or individual timed programming cells 202 and it will cause the display of the user PC 302 to display the program, if it is currently available; if it is not the proper time for a broadcast, then it will cause the display to show whatever is currently available on that channel. These clicks can also cause programming which is delivered via the Internet to appear. When a user clicks on a program and causes it to appear on the screen of user PC 302, this event is recorded. (It may be done with a small program on user PC 302, or it may be maintained centrally by programming guide providing computer 306.) (FIG. 3) The recorded programming selecting clicks can be used for various purposes, including generation of ratings data, parental monitoring of a child's viewing practices, and for computer-assisted control of a programming guide.

In a preferred embodiment, these program-selecting clicks are used by an artificial intelligence program at programming guide providing computer 306 to create and maintain a user profile which monitors the types of programming actually selected and presumably viewed by the user. It can monitor the duration of the session, assuming that the user uses the programming guide of the present invention to switch to another channel. This monitoring of duration helps to place the proper significance on an instance where the viewer is "channel surfing" or briefly looking at numerous programs to determine what to watch. With this approach, a more accurate and personalized viewing profile can be generated without the need for additional user profile selections. In other words, a user profile can be passive, in that it may not require cognitive thought by the viewer to program his or her preferences into the system. In a preferred embodiment, the artificial intelligence program would continuously update the viewer's profile to reflect changes. For example, a user may watch home and gardening television shows extensively during the winter months, but during the summer, the mix of programming actually viewed may switch. The artificial intelligence program could consider the time of day and day of week during which shows are watched, so that a more target recommendation or suggestion could be appropriate. For example, a particular viewer may watch full-length motion pictures during the evenings, but during the weekday mornings, they may be primarily interested in news and weather programming. The artificial intelligence program can be used to provide truly tailored viewing recommendations. Of course, the user could be required to log in with a person ID, so that the artificial intelligence program could create and maintain separate profiles for numerous persons who might be using the user PC 302. In a preferred embodiment, the person ID could be culled from the computer operating system user login data.

Now referring to FIG. 2, there is shown a program guide of the present invention. FIG. 2 is identical to FIG. 1 except that the content of linearly arranged guide content control tabs 208 are different from linearly arranged guide content control tabs 108. Linearly arranged guide content control tabs 208 include tabs such as "Mary Picks, "Joe's Favorites," "Suggestions for Joe," and "Recommendations for Mary." These are used to represent user input profiles, such as Mary's Picks and Joe's Favorites, as well as programming guides which are tailored, by the computer, using the programming-selecting clicks as a data source, as well a geographic information. Of course, any label may be placed on the tabs, the crucial difference being that each tab represents an individualized programming guide where the individualization may be a "user active" (i.e., user selected preference) or a "user passive" (i.e., computer monitoring of prior viewing practices) or a combination of the two.

Linearly arranged guide content control tabs 208 also show three tabs: "Home," "Office," and "Cottage." Since the present invention is an Internet-based programming guide which could be available to anyone able to access the Internet from any place in the world, the user may not be located at the same location each time they use the programming guide. As discussed in the above-referenced co-pending patent application entitled "Method and System For Providing Household Level Programming Information", the user PC 302 may provide location information to another computer. Here, programming guide providing computer 306 could use this location information to provide a location specific programming guide. The programming guide providing computer 306 could maintain separate profiles for the various locations from which the user accesses the programming guide providing computer 306. The viewer may have dramatically different viewing preferences when at the office as compared to a primary residence or a vacation home, and the programming available to the viewer may be different for such differing locations.

Now referring specifically to FIG. 3, there is shown a system of the present invention generally designated 300, which includes a user PC 302, Internet 304 and programming guide providing computer 306. Preferably, user PC 302 contains software, such as a browser and other necessary software for coupling to the Internet 304. Programming guide providing computer 306 can be any single computer or group of computers which perform the functions of the programming guides described herein. It should be understood that the software to implement the programming guide of the present invention could reside on user PC 302, programming guide providing computer 306 or a combination of the two. It is a matter of designer's choice as to the details of the software design and whether it will be maintained centrally on programming guide providing computer 306 or distributed to the many different users.

Throughout this description, reference is made to a television programming, because it is believed that the beneficial aspects of the present invention would be most readily apparent when used in connection with such programming; however, it should be understood that the present invention is not intended to be so limited and should be hereby construed to include other content, such as FM radio, digital cable radio, etc.

It is thought that the method and apparatus of the present invention will be understood from the foregoing description and that it will be apparent that various changes may be made in the form, construct steps, and arrangement of the arts and steps thereof, without departing from the spirit and scope of the invention or sacrificing all of their material advantages. The form herein described is merely a preferred exemplary embodiment thereof.

The invention claimed is:

1. An electronic programming guide system comprising:
   a personal computer comprising a browser at a first viewer location;
   a computer system at a second location, coupled to said personal computer and said browser via a computer network;

said browser displaying a guide comprising a plurality of linearly arranged tabs, where each tab is a link to one of a plurality of views of an electronic programming guide;

where each of said plurality of views is associated with one of a plurality of sources of signals;

wherein at least three of said plurality of sources of signals are broadcast TV, programming delivered over the internet, and satellite TV;

wherein said guide includes a two-dimensional array of programming cells where each cell represents a different time slot associated with a different television channel;

wherein said plurality of linearly arranged tabs is disposed on a periphery of said two-dimensional array; and wherein each of said plurality of views is limited to sources of signals available at said first viewer location.

2. A guide of claim 1 wherein said plurality of sources of signals represents all video programming sources available at said first viewer location.

3. A method of displaying programming information to a viewer comprising the steps of:

providing, to a personal computer user, an array of programming choices available to a viewer;

changing a characteristic of said array in response to a selection, made by said personal computer user, of a tab from a plurality of linearly arranged tabs disposed along a peripheral edge of said array;

changing display content associated with one of said plurality of linearly arranged tabs as a result of a prior action;

wherein said prior action is a computer-generated signal representative of a prior viewing selection by a viewer, wherein said prior action further comprises a user selection among a plurality of user preferences;

wherein said prior action further comprises a duration characteristic of a prior viewing selection by said viewer;

providing location information representative of a geographic location of said viewer and changing display content associated with one of said plurality of linearly arranged tabs based upon said location information; and wherein each of said plurality of linearly arranged tabs is dedicated to one of a plurality of sources of programming available at said geographic location.

4. A method of claim 3 wherein said plurality of sources of programming comprises broadcast TV.

5. A method of claim 4 wherein said plurality of sources of programming further comprises satellite TV.

6. A method of claim 5 wherein said plurality of programming sources further comprises internet delivered programming.

* * * * *